United States Patent [19]

Shingu

[11] Patent Number: 4,601,547
[45] Date of Patent: Jul. 22, 1986

[54] LIQUID CRYSTAL DISPLAY DEVICE HAVING CONTRAST-ENHANCING DYE

[75] Inventor: Hiroshi Shingu, Nagano, Japan

[73] Assignee: Seiko Epson Corporation, Tokyo, Japan

[21] Appl. No.: 487,544

[22] Filed: Apr. 22, 1983

[30] Foreign Application Priority Data

Apr. 26, 1982 [JP] Japan .................................. 57-69868

[51] Int. Cl.⁴ .............................................. G02F 1/13
[52] U.S. Cl. ............................................... 350/349
[58] Field of Search ................ 350/349, 335, 339 F

[56] References Cited

U.S. PATENT DOCUMENTS

| | | | |
|---|---|---|---|
| 4,105,299 | 8/1978 | Huffman et al. | 350/349 |
| 4,211,473 | 7/1980 | Shanks | 350/349 X |
| 4,359,398 | 11/1982 | Cole, Jr. et al. | 350/349 X |
| 4,383,738 | 5/1983 | Funada et al. | 350/349 |
| 4,389,329 | 6/1983 | Boller et al. | 350/349 X |

*Primary Examiner*—John K. Corbin
*Assistant Examiner*—Richard Gallivan
*Attorney, Agent, or Firm*—Blum Kaplan Friedman Silberman & Beran

[57] ABSTRACT

A liquid crystal composition for use in negative display, transmission-type, liquid crystal display elements, said composition comprising a nematic liquid crystal having positive dielectric anisotropy and a positive dichroic dye. Liquid crystal display devices comprising liquid crystal display cells including nematic liquid crystals having positive dielectric anisotropy and positive dichroic dyes are disclosed.

17 Claims, 7 Drawing Figures

LIQUID CRYSTAL DISPLAY DEVICE HAVING CONTRAST-ENHANCING DYE

BACKGROUND OF THE INVENTION

1. Field of the Invention

This invention relates to a twisted nematic liquid crystal device and, more particularly, to a twisted nematic liquid crystal negative display element of the light transmitting type having improved color tone and contrast through the addition of a positive dichroic die to the host nematic liquid. It has particular application to negative display type liquid crystal devices, which have zero to low transmittance in a non-selected region and a high transmittance in selected regions of the display, thereby effecting a white or light appearance in the selected region against a dark background.

2. Description of the Prior Art

Negative display liquid crystal devices using the twisted nematic effect, i.e., field effect liquid crystal display elements, include a nematic liquid crystal having a positive dielectric anisotropy, in a twisted orientation between upper and lower substrates and a pair of polarizing plates. Materials having a positive dielectric anisotropy orient in an electric field with the molecules preferentially parallel to the field and are used in field effect electro-optic devices.

In a typical device upper and lower substrates are spaced apart and a positive dielectric anisotropic nematic liquid crystal is disposed between the substrates. Generally, the liquid crystal between the upper and lower substrates is effectively twisted by an angle of about 90° by rubbing or otherwise treating the substrate surfaces to provide parallel orientations on the substrates and thereafter disposing the substrates so that these orientations are at an angle of 90° to each other. Polarizing plates are disposed between the upper and lower substrates so that the liquid crystal is disposed therebetween.

A negative display may be obtained if the polarizing axis of the lower polarizing plate coincides with the direction of orientation of the liquid crystal molecules contacting the lower substrate and with the polarizing axis of the upper polarizing plate. In an activated portion of the liquid crystal material, the liquid crystal molecules are brought into a perpendicular position with respect to the substrates, i.e. they are not twisted. The rotatory polarization disappears and this portion of the liquid crystal cell has a high light transmittance because the polarizing axes of the upper and lower polarizing plates coincide with each other. In the non-selected portion, the light transmittance is low because the liquid crystal twists the light perpendicular to the axes of the polarizing plates. As a result, the negative display liquid crystal device transmits light while non-selected portions of the liquid crystal display do not allow the light to pass.

One problem encountered in this arrangement results from leakage of light into the non-selected portion of the display element. Leakage impairs the quality of the display since the non-selected portion fails to completely shield the light. Additionally, unevenness in color tone resulting from light path retardation is another problem encountered. Retardation is also known as optical-path difference. In a liquid crystal display element the light is split into polarized beams at right angles to each other. Each beam of light has its own refractive index. The refractive index anisotropy is the difference between these two indices. In a liquid crystal display element the retardation is dependent upon the value of the refractive index anisotropy and the cell thickness. That is, the relation between them is formulated by $R = \Delta n \cdot d$, wherein R is retardation, $\Delta n$ is refractive index anistotropy, and d is substance thickness. Thus, with reference to the above-described general definition of retardation with respect to an optical path, it can be seen that as a consequence of the liquid crystal splitting an incident beam into two beams polarized at right angles to each other and having separate refractive indices, that the two beams will not propagate through the liquid crystal medium at the same rate. As a consequence, even slight differences in cell thickness between adjacent portions of a liquid crystal cell will give rise to differences in the length of the optical path of the perpendicular light waves. Such differences cause adverse effects on background contrast, color tone and also lead to leakage of transmitted light into a non-selected area. Such variations in cell thickness are a recurring problem as a consequence of the need to apply force to the liquid crystal elements during fabrication of a liquid crystal display device, as well as a lack of uniformity in cell thickness. For example, the dashboard panel for automobiles is large in size. Uniform cell thickness in a display area is very difficult to maintain, even with the use of spacers, because of the large area involved, and also the need to apply pressure over a large area of substrates to fabricate the liquid crystal cells.

Accordingly, it is desirable to provide an improved liquid crystal display device which overcome these problems and provide a display of improved contrast and color tone.

SUMMARY OF THE INVENTION

Generally speaking, in accordance with the invention, an improved liquid crystal display cell includes a host nematic liquid crystal composition including a dichroic dye composition capable of absorbing one of the two beams of light produced by a double refractive medium. In the non-lit, i.e. non-selected, portion of the cell, the light polarized by the lower polarizing plate (between the light transmitting source and the cell) has at the upper substrate a direction of polarization which is displaced at right angles to the lower substrate, and which is perpendicular to the polarizing axis of the upper polarizing plate. The light polarized by the lower polarizing plate is absorbed by the dichroic dye. Accordingly, the non-lit portion has very low transmittance.

In the lit, i.e. selected portion, the polarizing axes of the upper and lower polarizing plates coincide and the liquid crystal molecules are substantially perpendicular to the substrates; their rotatory polarization is lost. The dichroic dye molecules are also substantially perpendicular to the substrates, and absorb very little light. Accordingly, the lit portion has a high transmittance. A negative display is thus achieved by the twisted nematic effect and the positive dichroic dye.

Accordingly, it is an object of the invention to provide an improved liquid crystal display element.

A further object of the invention is to provide an improved liquid crystal medium.

Another object of the invention is to provide an improved liquid crystal medium including a dichroic dye.

Yet another object of the invention is to provide an improved liquid crystal medium including a positive dichroic dye.

Still other objects and advantages of the invention will in part be obvious and will in part be apparent from the specification.

The invention accordingly comprises a composition of matter and a product including the composition of matter possessing the characteristics, properties, and the relation of constituents which will be exemplified in the composition of the products hereinafter described and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
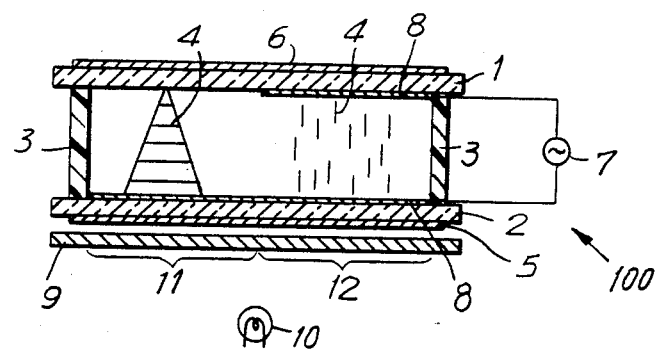
FIG. 1 is a cross-section of a segment of a transmission type, negative display, twisted nematic liquid crystal display element including a nematic liquid crystal with a positive dielectric anisotropy.

FIG. 1 illustrates in cross-section a segment of a transmission type, negative display, field effect liquid crystal display element 100 including a nematic liquid crystal having positive dielectric anisotropy. Display element 100 includes an upper substrate 1 and a lower substrate 2 held apart by spacers 3. A nematic liquid crystal 4, having positive dielectric anisotropy, is disposed between substrates 1 and 2. Opposed substrates 1 and 2 are transparent and have transparent electrodes 8 disposed on the inner surfaces thereof. Substrates 1 and 2 are treated by rubbing or other techniques well known to the art to cause an alignment of the liquid crystal adjacent thereto. A lower polarizing plate 5 and an upper polarizing plate 6 are disposed on opposed sides of liquid crystal display element 100, on the outer faces of lower substrate 2 and upper substrate 1. An A.C. voltage source 7 is provided for applying a voltage higher than the threshold voltage of the liquid crystal. Voltage source 7 is in electrical communication with transparent electrodes 8. Display element 100 is of the transmission type. A diffusion plate 9 is disposed between a light source 10 and lower polarizing plate 5 to provide a more equal distribution of incident light upon the liquid crystal display elements.

A negative display can be obtained when the polarizing axis of lower polarizing plate 5 coincides with the direction of orientation of liquid crystal molecules 4 in physical contact with lower substrate 2, as well as in coincidence with the polarizing axis of upper polarizing plate 6. In a selected portion 12 of display element 100, liquid crystal molecules 4 are perpendicular to lower substrate 2 and upper substrate 1 and their twisted structure is lost. As a result, there is no rotatory polarization by liquid crystal molecules 4 and a selected portion 12 has a high transmittance of light, since the polarizing axes of lower polarizing plate 5 and upper polarizing plate 6 coincide with each other. In this embodiment, there is leakage of light into a non-selected portion 11. This leakage is dependent upon the intensity of the light source, since non-selected portion 11 does not completely shield the incident light. In the activated, selected, portion 12, any lack of uniformity in thickness between upper substrate 1 and lower substrate 2 can readily lead to an unevenness in color tone as a result of light wave retardation. The contrast between selected 12 and non-selected regions 11 is also adversely affected by the light leakage. It should be noted that if diffusion plate 9 is formed from a light semi-permeable material, it is then possible to provide a combined transmission, reflection display element.

Figure 2:
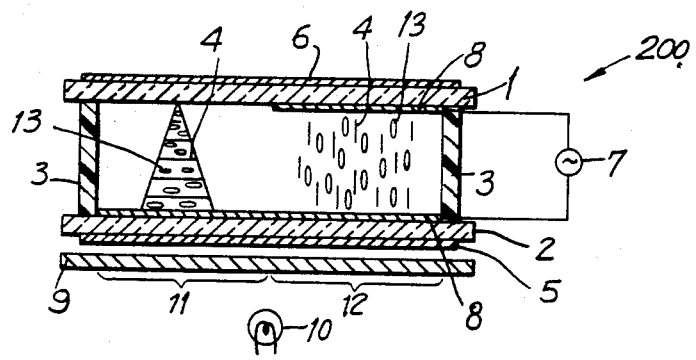
FIG. 2 is a cross-section of a segment of a transmission type, negative display, twisted nematic liquid crystal display element including a nematic liquid crystal with a positive dielectric anisotropy, and an infused positive dichroic dye.

FIG. 2 is a cross-section of a transmission type, negative display including a nematic liquid crystal 4 of positive dielectric anisotropy and a positive dichroic dye 13 in accordance with the invention. A negative display element 200, including liquid crystal molecules 4 and positive dichroic dye 13, eliminate the abovementioned drawbacks. The upper substrate 1 and lower substrate 2, lower polarizing plate 5 and upper polarizing plate 6, A.C. voltage source 7, upper and lower transparent electrodes 8, diffusion plate 9, and light source 10 are as described above with respect to FIG. 1. Materials suitable for use as the host nematic liquid crystal include those having a positive dielectric anisotropy and are, generally, well known to the art, e.g., azoxy, biphenyl, ester, PCH (phenyl-cyclohexane), BPCH (biphenyl-cyclohexane), CBCH (cyclohexyl-biphenyl-cyclohexane), etc., can be used as the host nematic liquid crystal. Dichroic dyes have the property of selectively absorbing one of the two rectangular components of light. A positive dichroic dye (P type), absorbs components which vibrate along the long axis. A negative dichroic dye (N-type), absorbs the component which vibrates along the short axis. In the present invention, positive dichroic dyes are preferably employed. Suitable positive dichroic dyes include blue and black dyes, especially azo and azoxy type dyes and anthraquinone type dyes, either alone, in combination with each other, or with additional positive dichroic dyes. The preferred, effective concentration range of the dyes is about 0.5 weight percent to about 3.0 weight percent. The preferred positive dichroic dyes include black dyes and blue dyes in amounts of from about 0.5 weight percent to about 3.0 weight percent of the liquid crystal composition. In smaller amounts there is insufficient dye to prevent light leakage. In higher amounts the dyes are generally infusible with the liquid crystal and the selected portion of the liquid crystal would also be dyed and therefore have low light transmittance.

The following examples are presented to illustrate the invention. They are not presented in a limiting sense.

EXAMPLE 1

Three liquid crystal panels including a first transparent plate having at least one common electrode on an interior surface and an opposed, spaced-apart second transparent plate disposed in confronting relation to the first transparent plate with signal electrodes on the facing surface and liquid crystal compositions described below sealed therebetween and polarizers on the outside of the substrates, all as described with respect to FIG. 2, above, were prepared.

The liquid crystal compositions included in the three separate panels are described in Tables 1A and 1B, as follows:

TABLE 1A

Figure 4:
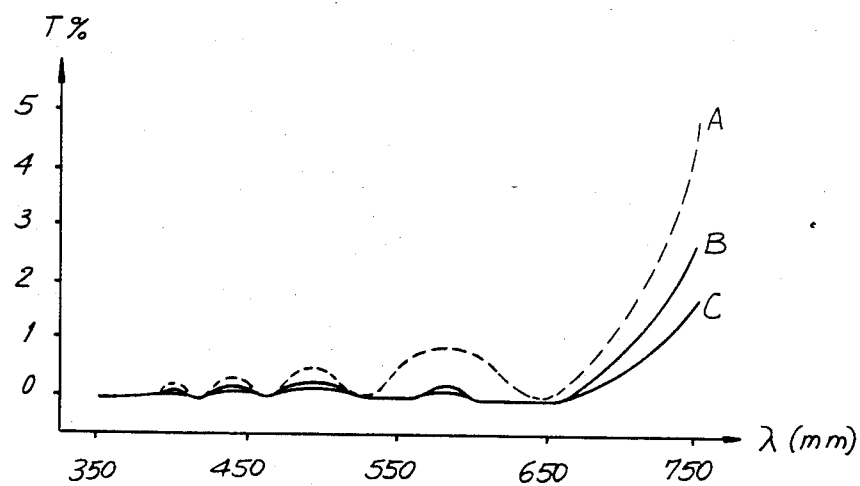
FIG. 4 is a graph illustrating the light transmittance of a liquid crystal cell including dichroic dyes according to the invention.
Figure 5:
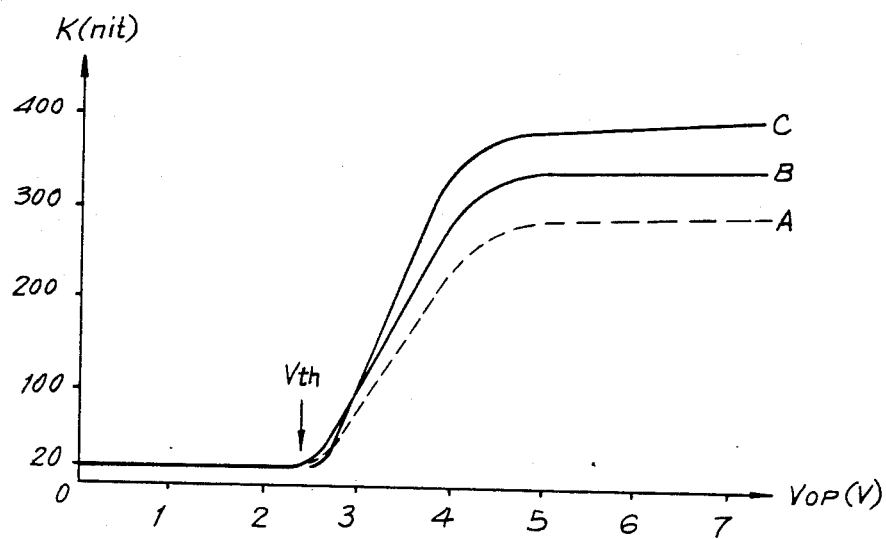
FIG. 5 is a graph illustrating the contrast ratio and threshold voltage of liquid crystal compositions according to the invention.

| Sample | Liquid Crystal | Dye Structure | Color | Conc. | FIGS. 4 & 5 CURVE |
|---|---|---|---|---|---|
| Panel 1 | ZLI-1565 (Merck & Co., Inc.) | — | — | 0% | A |
| Panel 2 | ZLI-1565 (Merck & Co., Inc.) | [structure with HO, NH$_2$, OC$_8$H$_{17}$, H$_2$N, OH groups on anthraquinone-phenyl] | Blue | 1% | B |
| Panel 3 | ZLI-1565 (Merck & Co., Inc.) | " | " | 2% | C |

TABLE 1B

ZLI-1565 LIQUID CRYSTAL

| Component | Weight Percent (Approximate) |
|---|---|
| C$_3$H$_7$—(H)(O)—CN | 17.0 |
| C$_5$H$_{11}$—(H)(O)—CN | 22.4 |
| C$_3$H$_7$—(H)(O)—OC$_2$H$_5$ | 15.5 |
| C$_3$H$_7$—(H)(O)—OC$_4$H$_9$ | 11.3 |
| C$_5$H$_{11}$—(H)(O)(O)—C$_2$H$_5$ | 23.0 |
| C$_5$H$_{11}$—(H)(O)(O)(O)—C$_3$H$_7$ | 10.8 |
| Total | 100.0 |

Figure 3:
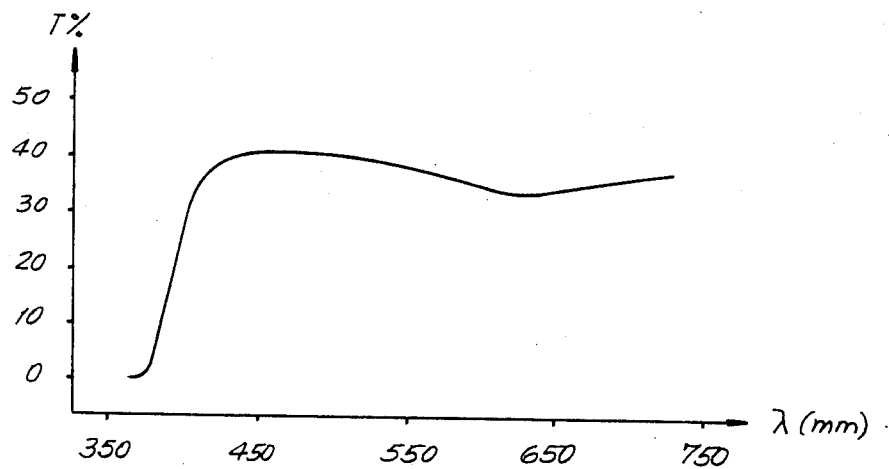
FIG. 3 is a graph illustrating the absorption spectra of polarizing plates of the liquid crystal display device of this invention.

FIG. 4 is a graph illustrating certain spectroscopic characteristics of the three liquid crystal composition samples in Panels 1, 2 and 3. These liquid crystal compositions were placed in the above-described liquid crystal display panels, each of which had a ten micron gap between the upper and lower substrates. The crystals were twisted by an angle of 90° between the upper and lower substrates and each display panel was provided with an upper polarizing plate and a lower polarizing plate having the absorption spectra shown in FIG. 3. The spectroscopic and electro-optical properties of each panel were studied. Curve A in FIG. 4 shows the spectroscopic characteristics of Panel 1, in which no positive dichroic dye was employed. Light transmission in the non-selected portion of the liquid crystal of Panel 1 was increased in comparison with transmission in the panels which included the positive dichroic dye, Panels 2 and 3. Curve B represents the transmittance characteristics of Panel 2, containing 1% of a blue dye, and Curve C depicts the transmittance characteristics of Panel 3, containing 2% of the blue dye (ZLI-1565 is a blue dye). The reduction in light transmittance in the non-selected portion of panels including the dichroic dyes is a result of an absorption of light by them and accompanying reduction in the light retardation effects of a nematic liquid crystal.

FIG. 5 is a graph illustrating the enhancement in contrast between the selected negative display region and an adjacent non-selected region. As can be seen by reference to FIG. 5, display panels 2 and 3 (the 1 and 2 weight percent dye bearing liquid crystal compositions) exhibit markedly improved contrast features in comparison with Panel 1, which contains no dichroic dye. FIG. 5 indicates that there was substantially no change in threshold voltage $V_{th}$ in Panels 2 and 3 when compared to the panel containing no dye. The contrast curves are based upon a transmission display with statically driven panels.

Table 2 illustrates the threshold voltage $V_{th}$ for each of Panels 1, 2 and 3, their contrast ratios and response speeds, i.e., time it takes for transmission once the threshold voltage is reached (rise-time—$t_{rise}$) and the time it takes for transmission to cease after threshold voltage has been withdrawn (fall-time—$t_{fall}$).

TABLE 2

| Sample | $V_{th}$ (V) | Contrast Ratio | $t_{rise}$ ($10^{-3}$ sec) | $t_{fall}$ ($10^{-3}$ sec) |
|---|---|---|---|---|
| Panel 1 | 2.4 | 14.5 | 70 | 70 |
| Panel 2 | 2.4 | 17 | 75 | 70 |
| Panel 3 | 2.5 | 19 | 75 | 70 |

Contrast ratio and response speed were determined using a five volt static drive at a temperature of 25° C. As can be seen in Table 2, the addition of dichoric die in Panels 2 and 3 did not bring about any substantial change in the electro-optical characteristics of the panels.

In the following examples, as in those for Panels 1, 2 and 3, the liquid crystals were twisted by an angle of 90° between the upper and lower substrates and the dichroic dye molecules therein were similarly oriented as in FIG. 2.

EXAMPLE 2

Liquid crystal display panels as described with respect to Example 1, but including the liquid crystal composition set forth below in Table 3, were prepared and tested.

TABLE 3

Figure 6:
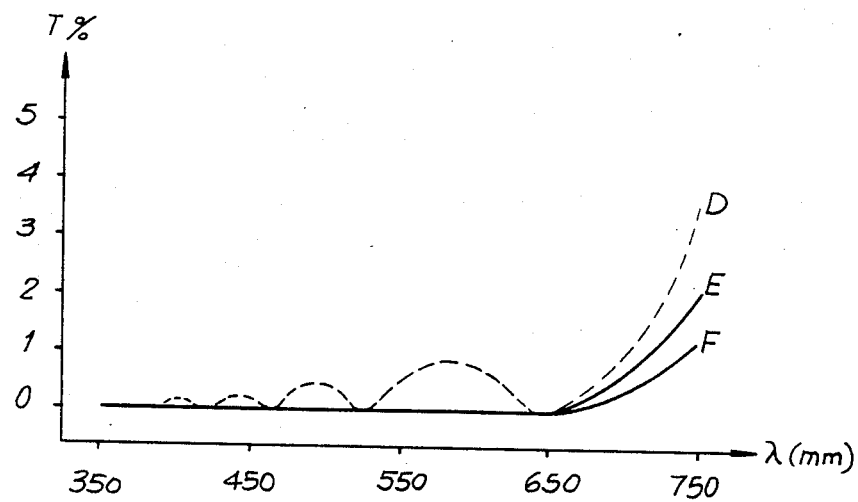
FIG. 6 is a graph illustrating the transmittance of a liquid crystal cell including dichroic dyes other than those included in the liquid crystal compositions in a display panel of the type illustrated in FIG. 2.
Figure 7:
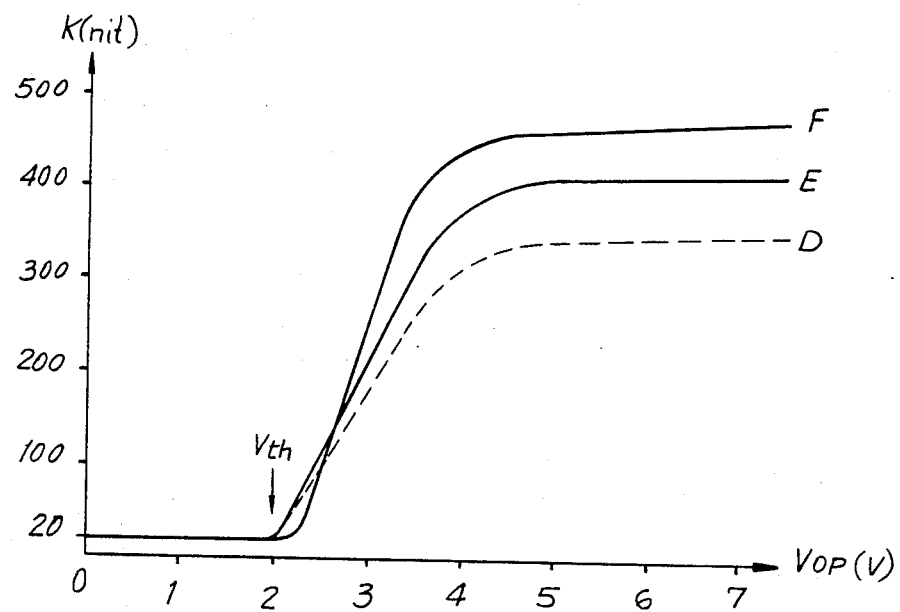
FIG. 7 is a graph illustrating the contrast ratio and threshold voltage of a liquid crystal cell including the dichroic dyes as in FIG. 6.

| Sample | Liquid crystal | Dye Structure | Weight ratio | Conc. | Color | Curve in FIGS. 6 and 7 |
|---|---|---|---|---|---|---|
| Panel 4 | E-7 (Merck) | — | — | 0% | — | D |
| Panel 5 | E-7 (Merck) | [anthraquinone dye with HO, O, NH2, H2N, OH, OC8H17] | 0.5 | 1% | Black | E |
| | | [anthraquinone dye with NH-C6H4-OC9H19] | 0.2 | | | |
| | | [C6H5-N=N-C6H4-N=N-C6H4-N(CH3)2] | 0.3 | | | |
| Panel 6 | E-7 (Merck) | [anthraquinone dye with HO, O, NH2, H2N, OH, OC8H17] | 0.5 | 2% | Black | F |
| | | [anthraquinone dye with NH-C6H4-OC9H19] | 0.2 | | | |
| | | [C6H5-N=N-C6H4-N=N-C6H4-N(CH3)2] | 0.3 | | | |

FIG. 6 displays the transmittance characteristics of the liquid crystal panels of Table 3. Curve D, corresponding to the liquid crystal with no dye, indicates increased transmittance and, therefore, color tone unevenness, when compared with Curves E and F for the panel, including dye in the liquid crystal composition. Liquid crystal composition E-7 has a positive dielectric anisotropy and is a composition including biphenyl and PCH (phenylcyclohexane) type liquid crystals. Curve E illustrates the spectroscopic characteristics of Panel 5, which contains 1% of a mixture of three black dyes. The absorption of light by the dichroic dyes reduces transmittance and retardation. Curve F illustrates the spectroscopic characteristics of Panel 6 which includes 2 weight percent dye. A comparison of FIGS. 4 and 6 discloses that the black dye compositions appear to be more effective than the blue dye compositions in preventing light transmittance and color tone unevenness.

FIG. 7 illustrates contrast curves obtained when using the panels in a transmission type mode. Contrast ratio and response speeds were determined using a 5-volt static drive at a temperature of 24° C. As shown in FIG. 7, addition of the dye to the liquid crystal composition increased the contrast ratio, but did not substantially change the threshold voltage $V_{th}$. Illustrated below in Table 4 is the threshold voltage for each of the panels, their contrast ratio and response speed.

TABLE 4

| Sample | $V_{th}$ (V) | Contrast Ratio | $t_{rise}$ ($10^{-3}$ sec) | $t_{fall}$ |
|---|---|---|---|---|
| Panel 4 | 2.0 | 17 | 75 | 90 |
| Panel 5 | 2.0 | 20.5 | 80 | 90 |
| Panel 6 | 2.2 | 23 | 85 | 90 |

These results indicate that the addition of the dichroic dye did not adversely effect the electro-optical characteristics of the display panels.

It is thus seen from the objects set forth above and the preceding description that this invention improves the quality of a negative display of a twisted nematic liquid crystal. The invention is particularly advantageous in negative display, transmission type liquid crystal panels which heretofore have suffered from the above-described light leakage and unevenness in color tone, disadvantages known to the art. Moreover, this invention effectively prevents any light leakage and color tone unevenness that is caused by retardation when a stress is applied to a panel composed of glass substrates.

If no dye were added, even a slight change in cell thickness, or a stress applied to a liquid crystal element during the fabrication of a liquid crystal element during the fabrication of a liquid crystal display device would give rise to differences in the position and height of the wave in the retardation curves shown in FIGS. 4 and 6. These differences would have adverse effects on the color tone, and promote leakage of light in the display negative. According to this invention, however, the dye incorporated in the liquid crystal layer substantially eliminates any and all leakage of light in the visible range. Therefore, it is possible to prevent any light leakage and color tone unevenness caused by the retardation which is due to the lack of uniformity in the cell thickness of the liquid crystal element, a stress applied to the liquid crystal element, or the like. Therefore, this invention provides a liquid crystal display element and a liquid crystal display device having a high quality of negative display, i.e., a uniform color tone and a high contrast.

It will thus be seen that the objects set forth above, among those made apparent from the preceding description, are efficiently attained and, since certain changes may be made in the above composition of matter without departing from the spirit and scope of the invention, it is intended tht all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly, it is to be understood that in said claims, ingredients or compounds which are recited in the singular are intended to include compatible mixtures of such ingredients, wherever the sense permits.

THE OTHER EXAMPLES (Example 1)

| component | wt % |
|---|---|
|  | 13 |
| 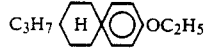 | 13 |
|  | 13 |
| 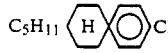 | 6 |
|  | 17 |
|  | 7 |
|  | 9 |
| the others | 22 |

When a liquid crystal composition comprises the compounds represented above, the refractive index anisotropy $\Delta n$ of the composition is 0.13. When the black and the blue dyes are respectively mixed with this liquid crystal composition, the spectroscopic characteristics are respectively the same as those shown in FIG. 4 and FIG. 6.

(Example 2)

| component | wt % |
|---|---|
|  $(R_1 + R_2 = 5)$ | 15 |
| 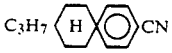 | 14 |
| 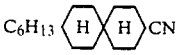 | 11 |
| 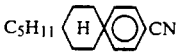 | 16 |
|  $(R_3 + R_4 = 7)$ | 20 |
|  | 8 |
|  $(R_5 + R_6 = 8)$ | 16 |

$R_1$–$R_6$ stand for straight-chain alkyl groups.

When a liquid crystal composition comprises the compounds represented above, the refractive index anisotropy $\Delta n$ of the composition is 0.13. When the black and the blue dyes are respectively mixed with this liquid crystal composition, the spectroscopic characteristics are respectively the same as those shown in FIG. 4 and FIG. 6.

(Example 3)

| component | wt % |
|---|---|
| 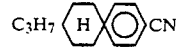 | 23 |
|  | 5 |
|  | 10 |
|  | 14 |
| 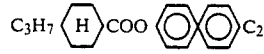 | 9 |
|  | 6 |

-continued

| component | wt % |
|---|---|
| C₅H₁₁—⟨⟩—⟨⟩—⟨⟩—CN | 10 |
| C₅H₁₁—⟨H⟩—⟨⟩—⟨⟩—CN | 10 |
| C₃H₅—⟨H⟩—⟨⟩—COO—⟨⟩—C₅H₁₁ | 5 |
| C₇H₁₅—⟨⟩—⟨N=N⟩—⟨⟩—CN | 4 |
| C₄H₉—⟨⟩—COO—⟨⟩—COO—⟨⟩—C₄H₉ | 4 |

When a liquid crystal composition comprises the compounds represented above, the refractive index anisotropy Δn of the composition is 0.13. When the black and the blue dyes are respectively mixed with this liquid crystal composition, the spectroscopic characteristics are respectively the same as those shown in FIG. 4 and FIG. 6.

(Example 4)

When ZLI-2142 liquid crystal composition with 0.13 as Δn made in MERCK & Co. is used, the spectroscopic characteristics are respectively the same as those shown in FIG. 4 and FIG. 6.

(Example 5)

When ZLI-2248 liquid crystal composition with 0.16 as Δn made in MERCK & Co. is used, the spectroscopic characteristics are respectively the same as those shown in FIG. 4 and FIG. 6.

(Example 6)

When 2701 liquid crystal composition with 0.14 as Δn made in HOFFMAN-LA-ROCHE-Inc. is used, the spectroscopic characteristics are respectively the same as those shown in FIG. 4 and FIG. 6.

(Example 7)

When 2706 liquid crystal composition with 0.13 as Δn made in HOFFMAN-LA-ROCHE-Inc. is used, the spectroscopic characteristics are relatively the same as those shown in FIG. 4 and FIG. 6.

(Example 8)

The dye represented by the following formula is used as a blue dye.

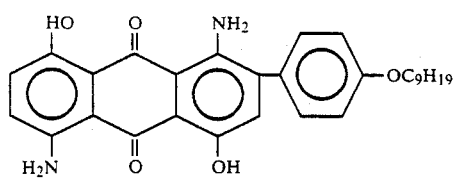

(Example 9)

The dye represented by the following formula is used as a blue dye.

[structure: anthraquinone with H₂N, OH, O, HO, NH₂ substituents and —OC₉H₁₉ phenyl group]

(Example 10)

A mixture containing the dye represented by the following formula and the dye of (Example 8) is used as a blue dye.

[structure: anthraquinone with HO, O, NH₂, H₂N, O, OH substituents and —OC₈H₁₇ phenyl group]

(Example 11)

A mixture containing the dye represented by the following formula and the dye of (Example 9) is used as a blue dye.

[structure: anthraquinone with HO, O, NH₂, H₂N, O, OH substituents and —OC₈H₁₇ phenyl group]

(Example 12)

A mixture containing the dye represented by the following formula and the dyes of (Example 8) and (Example 9) is used as a blue dye.

[structure: anthraquinone with HO, O, NH₂, H₂N, O, OH substituents and —OC₈H₁₇ phenyl group]

(Example 13)

A black dye is made by substituting the blue dyes represented in (Example 8)–(Example 12) for the blue dye represented by the following formula in Table 3.

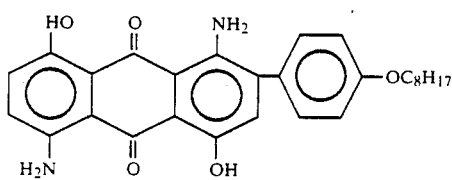
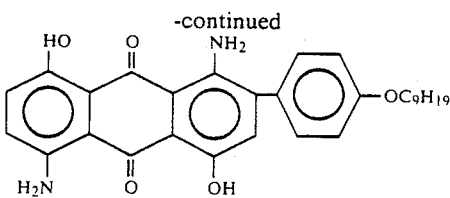

(Example 14)

A black dye is made by substituting the yellow dye represented by the following A formula for the following B formula in Table 3.

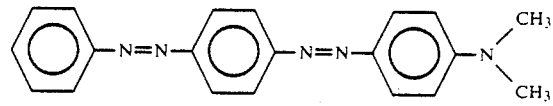

A

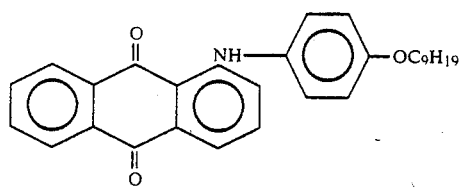

B

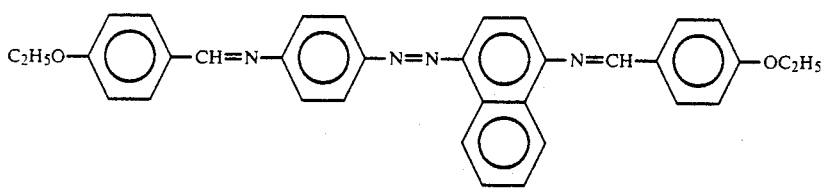

At least one of the dyes represented by each of the following chemical formulas is used as a yellow dye.

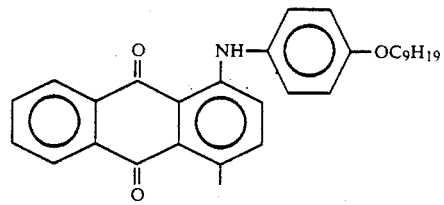

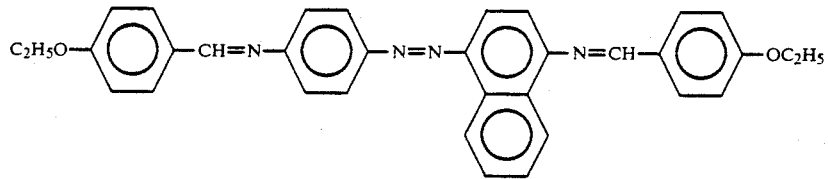

(Example 15)

At least one of the dyes represented by each of the following chemical formulas is used as a blue dye.

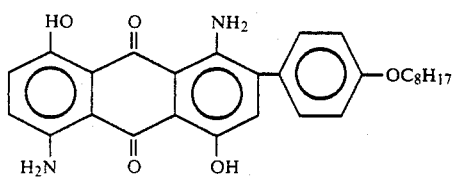

The dyes represented by the following formula is used as a orange-color dye.

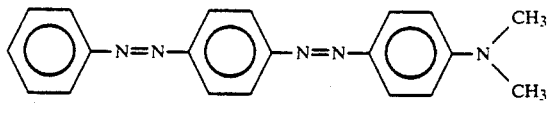

A mixture containing blue, yellow, and orange-color dyes in a ratio by weight of 0.7:0.15:1.15 is used as a black dye.

(Example 16)

A mixture containing blue, yellow and orange-color dyes of (Example 15) in a ratio by weight of 0.7:0.2:0.1 is used as a black dye.

(Example 17)

A mixture containing blue, yellow and orange-color dyes of (Example 15) in a ratio by weight of 0.7:0.1:0.2 is used as a black dye.

(Example 18)

A mixture containing blue, yellow and orange-color dyes of (Example 15) in a ratio by weight of 0.8:0.1:0.1 is used as a black dye.

(Example 19)

A mixture containing blue, yellow and orange-color dyes of (Example 15) in a ratio by weight of 0.6:0.2:0.2 is used as a black dye.

(Example 20)

A mixture containing blue, yellow and orange-color dyes of (Example 15) in a ratio by weight of 0.5:0.25:0.25 is used as a black dye.

(Example 21)

A mixture containing blue, yellow and orange-color dyes of (Example 15) in a ratio by weight of 0.5:0.16:0.34 is used as a black dye.

(Example 22)

A mixture containing blue, yellow and orange-color dyes of (Example 15) in a ratio by weight of 0.5:0.34:0.17 is used as a black dye.

(Example 23)

At least one of the dyes represented by each of the following chemical formulas is used as a blue dye.

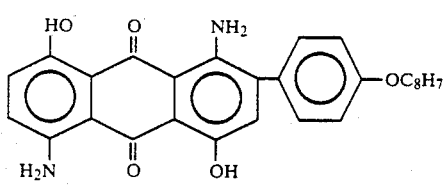

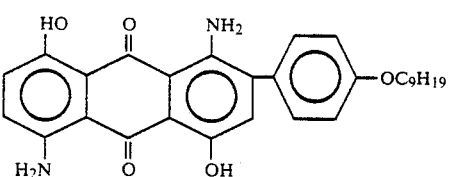

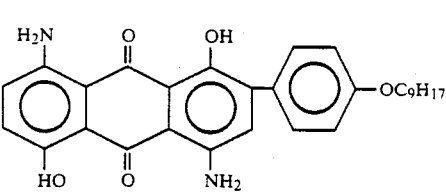

At least one of the dyes represented by each of the following chemical formulas is used as a purplish red dye,

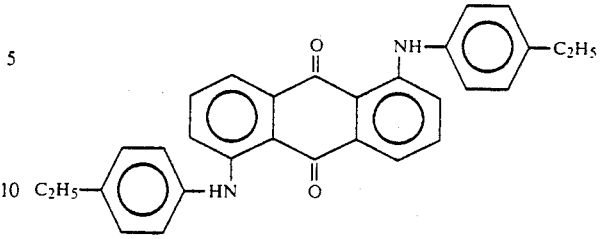

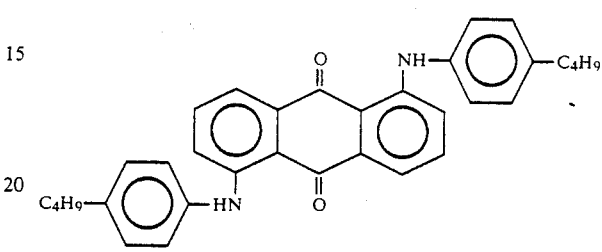

A mixture containing the blue dyes and the purplish red dyes in a ratio by weight of 0.3:0.7–0.5:0.5 is used as a purple dye. A compound containing 0.5–3% by weight of the purple dye produces the same effect as the blue dye and the black dye.

What is claimed is:

1. A liquid crystal composition for use in a field effect negative display liquid crystal display element, comprising a nematic liquid crystal having positive dielectric anisotropy and an effective amount of a positive dichroic dye for eliminating leakage of incident light through non-selected portions of the display element.

2. A liquid crystal composition, as described in claim 1, wherein said positive dichroic dye comprises a black dye.

3. A liquid crystal composition, as described in claim 1, wherein said positive dichroic dye comprises a blue dye.

4. A liquid crystal composition, as described in claim 1, wherein said positive dichroic dye comprises a mixture of a black dye and a blue dye.

5. A liquid crystal composition, as described in claim 1, wherein said nematic liquid crystal comprises from about 99.5 to about 97.5 weight percent of said composition and said positive dichroic dye comprises from about 0.5 to about 3.0 weight percent of said composition.

6. A liquid crystal composition, as described in claim 5, including a black dye which comprises:

about 50 weight percent

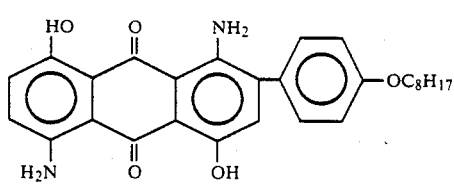

about 20 weight percent

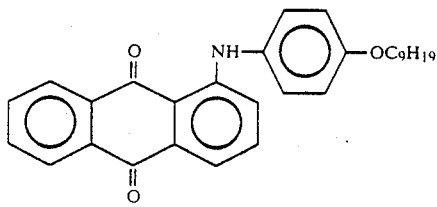

and about 30 weight percent of

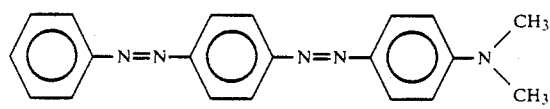

7. A liquid crystal composition, as described in claim 5, wherein said positive dichroic dye comprises:

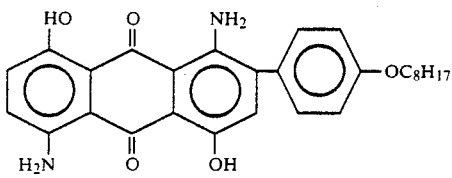

8. A liquid crystal composition, as described in claim 7, wherein said nematic liquid crystal comprises about:

| Component | Weight Percent (Approximate) |
|---|---|
| $C_3H_7$—⟨H⟩⟨O⟩—CN | 17.0 |
| $C_5H_{11}$—⟨H⟩⟨O⟩—CN | 22.4 |
| $C_3H_7$—⟨H⟩⟨O⟩—$OC_2H_5$ | 15.5 |
| $C_3H_7$—⟨H⟩⟨O⟩—$OC_4H_9$ | 11.3 |
| $C_5H_{11}$—⟨H⟩⟨O⟩⟨O⟩—$C_2H_5$ | 23.0 |
| $C_5H_{11}$—⟨H⟩⟨O⟩⟨O⟩⟨H⟩—$C_3H_7$ | 10.8 |

9. A field effect liquid crystal display cell, comprising:

a first transparent substrate having transparent electrode means selectively deposited on one surface thereof;

a second transparent substrate having transparent electrode means selectively deposited on one surface thereof for cooperating with the electrode means on the first substrate for forming a display;

said substrates disposed with the electrode means facing each other and spaced apart for forming an interior space therebetween;

a liquid crystal material disposed in the space between the substrates;

each electrode means having disposed thereon orientation means having a direction of orientation;

a polarizer disposed on the surface of each substrate on the side opposed to the electrode means;

the liquid crystal material including a nematic liquid crystal having positive dielectric anisotropy and a dichroic dye admixed therein;

the molecules of the liquid crystal material lying substantially parallel to the direction of orientation of the substrates in the vicinity of the substrates with the molecules in the intermediate area between the substrates rotated at an angle to the direction of orientation; and the axes of polarization of one of the polarizers coinciding with the direction of orientation of the liquid crystal molecules contacting that substrate for providing a negative display.

10. A liquid crystal display cell as described in claim 9, wherein said liquid crystal layer is twisted by an angle of about 90° between said opposite surfaces thereof, wherein one of said polarizers is disposed adjacent to one of said surfaces of said liquid crystal layer, and has an axis of polarization substantially coincident with the direction of orientation of said molecules adjacent to said one surface, while the other polarizer is disposed adjacent to the other surface of said layer, and has an axis of polarization substantially coinciding with said axis of polarization of said one polarizer.

11. A liquid crystal display cell, as described in claim 9, wherein said dye effects a blue color.

12. A liquid crystal display cell, as described in claim 9, wherein said dye effects a black color.

13. A liquid crystal display cell, as described in claim 9 wherein said nematic liquid crystal layer contains about 1 to about 2 weight percent of said dye.

14. A liquid crystal display device as described in claim 9 comprising a liquid crystal display cell.

15. A liquid crystal display device, as described in claim 14 including means for statically driving the liquid crystal display cell.

16. A liquid crystal display device, as set forth in claim 14, further comprising a light diffusion element on at least one surface thereof, upon which a beam of light is incident.

17. A liquid crystal display device, as set forth in claim 14, further comprising a semipermeable light diffusion element upon which a beam of light is incident to provide a combined transmission and reflection type liquid crystal display device.

* * * * *